Patented Jan. 1, 1935

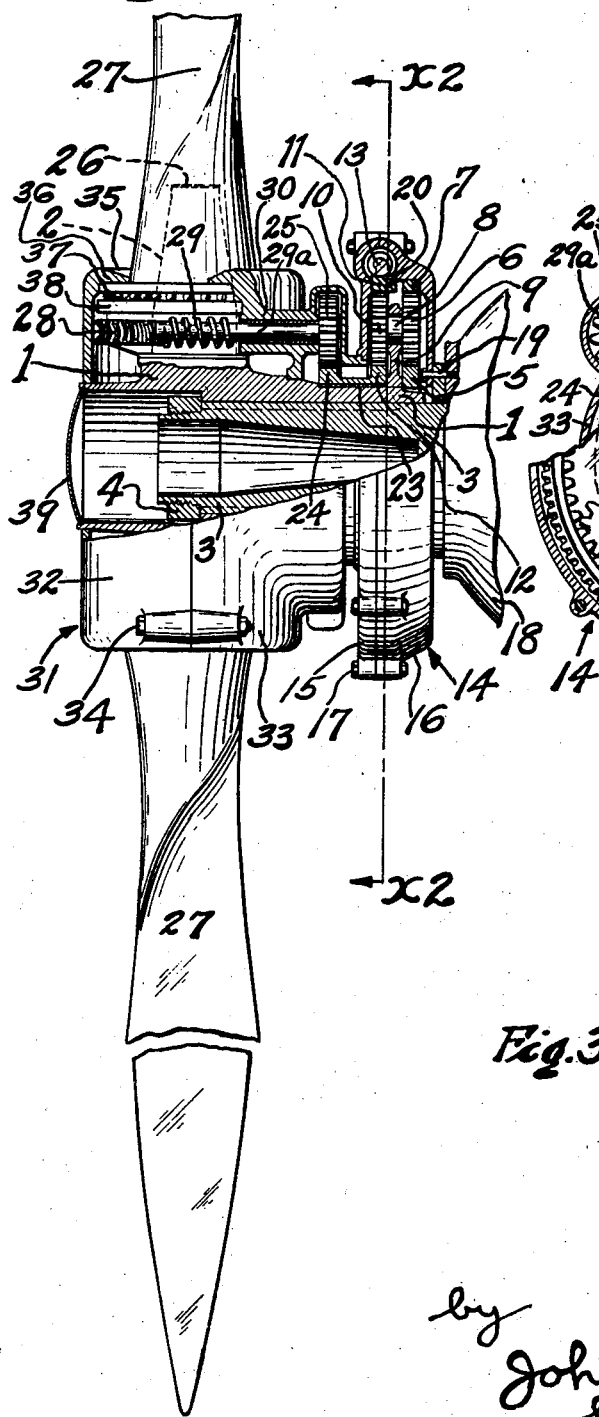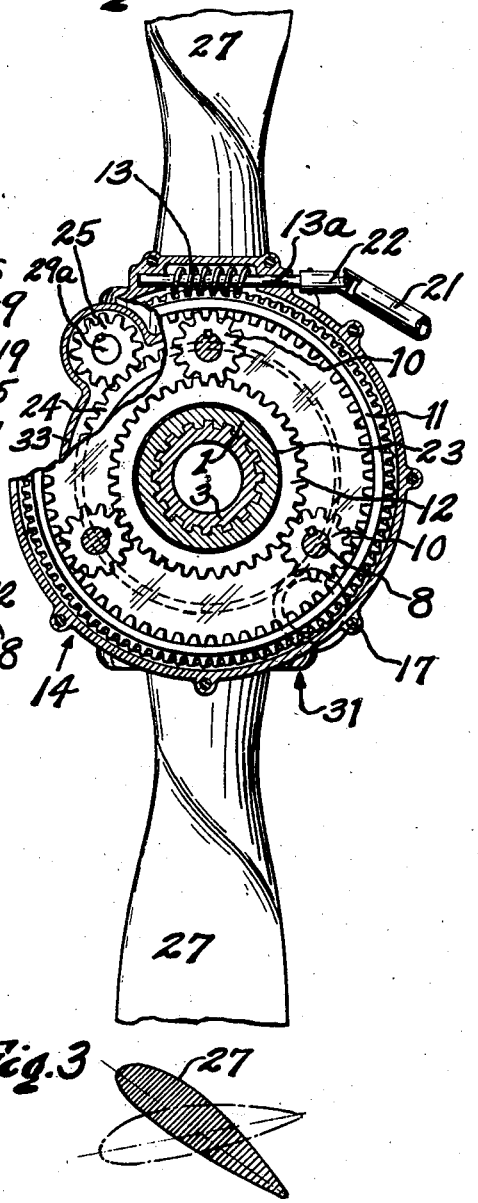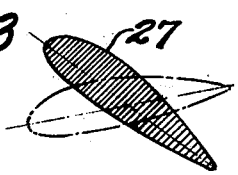

1,986,229

UNITED STATES PATENT OFFICE 1,986,229

CONTROLLABLE PITCH PROPELLER

Robert M. Stanley, Los Angeles, Calif.

Application September 13, 1933, Serial No. 689,235

2 Claims. (Cl. 170—163)

This invention relates more particularly to aircraft propellers to enable the pilot to vary the pitch of the propeller blades.

An object of this invention is to provide a means whereby the operator of an airplane or airship may at will vary the pitch angle of the propeller blades irrespective of engine speed, air speed, or meteorological conditions to any one of an infinite number of pitch angles, thus enabling him to adapt the propeller to its most efficient positions corresponding to the various conditions of speed, loading, altitude, rate of climb and flight attitudes.

Another object of the invention is the provisions for reversing the pitch angle of the propeller blades facilitating handling while upon the ground and providing a method whereby the motor power may be harnessed to act as a very powerful brake, reducing the time and distance required for landing consequently enabling one to land in restricted areas.

A further object of the invention is the possibility in case of motor failure, of feathering the propeller blades to a position exposing their thinner dimensions to the air stream, effecting a reduction of aerodynamic drag, a result of which would be increased flying range and greater speed for the aircraft.

A feature of the invention is the ease with which an indicator may be affixed to the actuating shaft leading to the pilot's compartment showing him at exactly what pitch angle the propeller is functioning at all times.

Another object of the invention is the reliability of this mechanism which is positive in action and simple of operation, readily operated by manual means independent of centrifugal forces of rotation, fluid pressures, electrical energy, or power derived from springs or similar devices.

Other objects of this invention are better performance characteristics of the aircraft; aircraft especially airplanes equipped with this adjustable pitch propeller can be operated more efficiently than aircraft not so equipped.

An airplane may set its pitch low while warming up its motor, reverse its propeller pitch angle, back out of the hanger, set the propeller to a low pitch position for taxiing on the ground; with the propeller set to a low pitch position the airplane can take off in a shorter distance or with a proportionately heavier load than an airplane whose propeller is not adjustable.

Once in the air the propeller may be so adjusted as to give a maximum rate of climb. Leveling off, the pilot can increase the pitch angle of the blades of the propeller to their most efficient working position for that altitude and load, increasing speed, lowering rate of fuel consumption, decreasing mechanical wear and noise and increasing cruising radius.

For military or similar tactics such as dive-bombing the pitch may be still further adjusted to compensate for changing flight attitudes. Should it be desirable to fly at high altitudes, the pitch angle may be accommodated to the more rarefied atmosphere encountered there.

The invention is not limited to the specific construction shown, and it is understood that forms of embodiment other than those shown may be employed without departing from the invention or from the principles therein disclosed and embodied in the mechanism herein set forth and claimed.

Other objects, advantages and features of invention may appear from the accompanying drawing, the subjoined detailed description and the appended claims.

The invention may be understood by reference to the accompanying drawing.

Figure 1 is a fragmental side elevational view of the invention with parts broken away to show interior construction and some parts are shown in section.

Fig. 2 is an end elevation taken on line $x2$—$x2$ Fig. 1 partly in section with fragments broken away to show parts beyond.

Fig. 3 is a diagrammatic view of the propeller blades showing two different positions of the blades.

The invention comprises a propeller shaft 1 having blade spindles 2 projecting perpendicular from the axis of the shaft at its forward end.

The propeller shaft 1 being splined to receive a conventional type of motor shaft 3 and said shafts being secured together by propeller shaft nut 4.

Keyed to propeller shaft 1 is a driving gear 5 which is in mesh with planetary gears 6 of which there are three shown that are rotatably mounted upon spindles 8 that are supported by a spider 9. Encircling the gears 5 and 6 and concentric with the axis of propeller shaft 1 and driving gear 5 is annular gear 7 whose internal teeth mesh with the teeth of gears 6. On the opposite face of spider 9 and mounted upon the spindles 8 are planetary gears 10 of which there are three shown that are identical in size and diameter to gears 6.

Meshing internally with planetary gears 10 and externally with worm gear 13 is adjustable annular gear 11.

A gear housing 14 encloses said gears and parts 5 to 13 inclusive and comprises a front section 15 and a rear section 16 held together by bolts 17 and secured by bolts 19 to motor 18 a fragment of which is shown.

The gear housing 14 forms a fixed support for annular gear 7, a bearing support for shoulder 20, an integral part of adjustable annular gear 11 and a bearing support for worm gear 13 and its shaft 13a.

Leading from the pilot's compartment not shown is pitch change actuating shaft 21 a fragment of which is shown flexibly connected as by a universal joint 22 with worm gear shaft 13a.

In mesh with planetary gears 10 and containing a bushing 23 rotatably mounted in bearing contact against the outside of propeller shaft 1 is driven gear 12 identical in diameter to driving gear 5.

Integral with or connected to gear 12 is gear 24 that meshes with the gears 25 of which there are two, one for each propeller blade.

Recesses 26 in the inner ends of the propellers 27 fit over the blade spindles 2 and keyed to the inner ends of the propeller blades 27 are worm gears 28 that mesh with pitch change driving worms 29 having shaft extensions 29a which are rotatably mounted within bearings 30 and that are keyed to gears 25.

Enclosing the spindles 2, inner ends of propeller blades 27 and related parts and being rigidly supported by the propeller shaft 1 is a propeller hub 31 consisting of a front segment 32 and a rear segment 33 secured together by bolts 34.

Projecting into circular openings 35 through which protrude propeller blades 27 are flanges 36 forming a support for anti-friction thrust bearings 37 which are mounted upon the flanged portion 38 of the propeller blade 27.

A removable cap 39 is provided that closes off the front end of the propeller shaft 1.

In normal operation of the propeller unit the spur driving gear 5, being fixed to rotating propeller shaft 1, drives spider driving planetary gears 6 causing them to revolve about the propeller shaft axis within and in mesh with the fixed annular gear 7. Planetary gears 6 by their movement about the propeller shaft axis, impart angular movement to spider 9 to which they are connected by spindles 8 upon which said planetary gears 6 are rotatably mounted.

The movement of spider 9 is transmitted through spindles 8 to another set of planetary gears 10, which gears are identical in diameter to spider driving planetary gears 6. Since planetary gears 10 are in mesh with adjustable annular gear 11 which is identical in diameter to gear 7 any movement of gears 10 would cause them to rotate about their shaft axes which in turn would impart motion to driven gear 12 whose size is identical in diameter to driving gear 5.

Since diameters of said gears 12 and 5, 10 and 6, 7 and 11 are respectively identical the train value of gear train 5, 6 and 7 is equivalent to the train value of gear train 12, 10 and 11.

Thus driven gear 12 rotates at the same rate as driving gear 5 and there is no resultant motion between gears 12, 10 and the propeller shaft 1 for any fixed position of an adjustable annular gear 11.

When relative motion between fixed annular gear 7 and movable annular gear 11 is accomplished by such means as worm gear 13 meshing externally with annular gear 11 and driven by the pilot from his compartment through some linkage as shaft 21 and flexible joint 22, thus such relative motion causes a corresponding relative motion between driving gear 5 and driven gear 12. Likewise since gear 5 is fixed to propeller shaft 1, there is a relative motion between driven gear 12 and propeller shaft 1.

As gears 24 and 12 are rigidly connected said gear 24 also moves relative to propeller shaft 1. The hub 31 rigidly connected to propeller shaft 1 contains bearing 30 for the worm gear shaft 29a. Thus gear 24 moves relative to propeller shaft 1 and also moves relative to worm gear shaft 29a.

Gear 24 meshing with gear 25 causes it to rotate about its shaft axis which in turn causes worm 29 to drive worm wheel 28, which is fixed to propeller blade 27, thereby causing the propeller blade to rotate about its blade axis changing its pitch angle.

I claim:

1. A propeller for airships comprising in combination with a driving shaft; a propeller shaft mounted on and fixed to said driving shaft and being provided with outwardly extending blade spindles at its forward end; a housing mounted on the shaft and provided with circular openings; a driving gear fixed to said propeller shaft; a plurality of planetary gears; a spider provided with spindles on which are mounted said planetary gears; an annular gear provided with internal teeth that mesh with said planetary gears and said driving gear meshes with said planetary gears; propeller blades mounted on said blade spindles and extending through said circular openings of said housing; means to actuate said gears comprising a worm gear mounted on a worm gear shaft connected by a universal joint to a pitch change actuating shaft to revolve the propeller blades and means to actuate said propeller blades to change the pitch angle of said propeller blades.

2. An air propeller comprising in combination with a propeller shaft; a motor shaft; a propeller shaft nut; said propeller shaft provided with a spline to receive said motor shaft and being secured together by said propeller shaft nut; a driving gear fixed to said propeller shaft; a spider mounted on said propeller shaft provided with a plurality of spindles mounted therein; a set of planetary gears mounted on one side of said spider and a set of spider driving planetary gears on the other side; said gears being fixed to said spindles; a gear housing enclosing said gears and spider; blade spindles projecting perpendicular from the axis of said propeller shaft; propeller blades fitting over said blade spindles; a propeller hub fixed to said propeller shaft and being provided with circular openings through which protrude said propeller blades; mechanical means comprising a worm gear mounted on a worm gear shaft connected by a universal joint to a change actuating shaft to revolve said propeller and gear means comprising a driving gear meshing with pinion gears that drive a plurality of worm gears and worm wheels to operate said planetary gears to rotate said propeller blades to change their pitch angle.

ROBERT M. STANLEY.